United States Patent Office 3,575,882
Patented Apr. 20, 1971

3,575,882
ENCAPSULATION PROCESS
Jan E. Vandegaer, Wayne, N.J., and Frank G. Meier, Tuxedo, N.Y., assignors to Pennwalt Corporation
No Drawing. Continuation-in-part of application Ser. No. 444,381, Mar. 31, 1965. This application Sept. 25, 1968, Ser. No. 762,603
Int. Cl. B01j *13/02;* B44d *1/02*
U.S. Cl. 252—316                    7 Claims

ABSTRACT OF THE DISCLOSURE

In a process for encapsulation by interfacial condensation of a pair of complementary, direct-acting, organic, polycondensate-forming intermediates in separate first and second liquids which are substantially immiscible, thereby encapsulating droplets of the first liquid within a skin of the produced polycondensate, the character of the two liquids being such that the polycondensate skin grows away from the first liquid and into the second liquid at any interface therebetween, the improvement for preventing coalescence and agglomeration of the capsules both during and after the termination of polycondensate skin growth, characterized by the presence of a solid finely divided dispersing agent in the second liquid while the polycondensate skin is growing, the agent being substantially insoluble in the first and second liquids, and being of sufficient particle size to be retained on the polycondensate skin surface.

CROSS-REFERENCES TO RELATED APPLICATIONS

This application is a continuation-in-part of our copending application Ser. No. 444,381, filed Mar. 31, 1965 for Encapsulation Process, now abandoned. The present invention embraces improvements in encapsulation procedures described by one of the present inventors, Jan E. Vandegaer, in his copending application Ser. No. 710,293, filed Mar. 4, 1968, and in his application Ser. No. 330,255, filed Dec. 13, 1963, now abandoned in favor of said application Ser. No. 710,293 which is a continuation-in-part thereof, all of the aforesaid other applications being assigned to a common assignee with the present application.

BACKGROUND OF THE INVENTION

This invention relates to encapsulation and particularly to the production of small or minute capsules constituted by a skin of organic composition enclosing a liquid droplet or other body of material. The invention is specifically directed to an improved process wherein such capsules, which may be produced to a desired size, are conveniently and rapidly evolved about droplets or bodies by chemical reaction at a suspension or collection of discrete spheres or spheroids in a body of liquid from which they may be readily separated with an improved degree of freedom from coalescence and agglomeration.

Capsules of this character have a variety of uses, as for containing dyes, inks, chemical reagents, pharmaceuticals, flavoring materials, pesticides, herbicides, peroxides, and indeed anything which can be dissolved, suspended or otherwise constituted in or as the liquid enclosed by the capsule, and which, in such liquid or other form, is to be preserved until it is released by some agency that breaks, crushes, melts, dissolves or otherwise removes the capsule skin, or until release by diffusion is effected under suitable conditions. While this encapsulation is primarily concerned with the preservation of minute droplets in the liquid state, it is also contemplated that the process may be used for enclosing liquid bodies which may be converted, within the capsule, to other, e.g. solid form, yielding encased solid particles having special purposes as a granular, protected form of the enclosed substance.

In the above-cited Vandegaer applications Ser. Nos. 710,293 and 330,255, said Ser. No. 300,255 having been abandoned, a process of encapsulation is taught wherein interfacial condensation of a pair of complementary direct-acting, organic, polycondensate-forming intermediates in separate liquids which are substantially immiscible, is brought about by establishing droplets of a first of said liquids, which contains one of the intermediates, within a body of the other liquid, and thereafter adding the second of the intermediates to said continuous liquid phase, to effect polycondensation between the intermediates at the interphases of the droplets and the continuous liquid phase, for encapsulating said droplets within a skin of the produced polycondensate.

It is sometimes necessary, when certain active ingredients are to be encapsulated by the aforesaid process of the cited applications, that the liquid contained within the capsulated skin, i.e., the first said liquid described above, should be water. It has been found that when the aforesaid process is carried out such that the droplets are water and the second liquid, i.e. the continuous phase liquid, is an organic solvent as defined in the cited applications, certain problems occur. These problems do not occur in the reverse situation, i.e. with organic liquid droplets in a continuous aqueous phase.

The main problem observed with aqueous droplets in an organic liquid continuous phase springs from the fact that the polymer grows outward from the original interface between the aqueous droplets and the continuous organic phase. That is to say, the polymer grows into the organic liquid continuous phase and away from the centers of the droplets. The original interface therefore eventually forms the inner polymer surface. On the other hand, with organic liquid droplets in a continuous aqueous phase, the polymer growth is inward from the original interface. The original interface therefore, instead of eventually forming the inner polymer surface, instead eventually forms the outer polymer surface.

One result of this outward growth of the polymer with aqueous droplets in the continuous organic liquid phase, is that the polymer tends to be unprotected by the normal liquid or soluble dispersing agents. This is because these agents tend to stay at the original interface, and since with outward polymer growth this eventually forms the inner polymer surface, the outer polymer surface is unprotected and is tacky and subject to agglomeration.

On the other hand, with organic droplets in a continuous aqueous phase, any tackiness that may occur can successfully be attenuated by the use of the aforesaid liquid or soluble dispersing agents. This is because since such agents migrate to the original interface, and since due to inward growth of the polymer with organic droplets that interface is permanently situated at the outermost layer of the polymer, the agent is effective to attenuate agglomeration by stabilizing what remains the outermost layer.

Furthermore, it has been found that post-addition of liquid or soluble dispersing agents does not help in the encapsulation of aqueous bodies, because the agents are thermodynamically impelled to migrate to the original interface, and since they are capable of passing through the intervening growing polymer layer to get to that original interface, they do not stabilize the outer polymer surface. Thus with aqueous droplets the original interface is inward of the growing polymer layer, and migration of the agent thereto adds no protective attribute to the outer boundary of the growing polymer layer where the coalescence problem occurs.

While aqueous capsules can be manufactured by the process of the cited applications despite this problem, considerable care must be exercised at all stages of the process to attempt to reduce coalescence of the individual encapsulated aqueous droplets. Economy is often sacrificed by forcing one to work in very high dilutions (droplets per total volume) in order to avoid coalescence. Moreover, despite such extra care, coalescence remains a magnified problem with the encapsulation of aqueous bodies.

In general, the present invention solves the problem involved in the outward growth of the capsulating polymer upon the liquid droplets, as aforesaid, regardless of the nature of the specific droplet liquid and continuous phase liquid involved. Any two liquids that afford a system wherein the polymer grows outward from the interface between the droplets and the continuous phase, is benefited by the present invention.

Thus, the situation of aqueous droplets disposed in a continuous organic liquid phase, with which it is substantially immiscible, is but one highly important example of the class of liquid combinations wherein the polymer grows outward into the continuous phase, thus giving rise to the problem under discussion, as aforesaid. In general, the polymer will grow into the more hydrophobic liquid and away from the more hydrophilic liquid (or the aqueous liquid). This is true regardless of which is the continuous phase, and indeed, the reversal of the phases is what reverses the direction of growth of the polymer. In this specification, where reference is made to the nature of the two liquids which give rise to the problem of the polymer growing outward of the droplets, the terms "aqueous" liquid and "organic" liquid are employed. These terms are to be understood to include, respectively, hydrophilic and hydrophobic liquids. Thus the invention, while directed to any combination of liquids wherein the polymer is caused to grow outward of the droplet phase, can be specifically viewed as applied to a droplet phase comprising a water based liquid or a hydrophilic liquid, disposed in a continuous phase (substantially immiscible therewith) comprising a carbon compound liquid or a hydrophobic liquid. Hydrophilic and hydrophobic liquids are to be understood as being such relative to one another.

It is an object of the present invention to provide an improved process for encapsulating droplets of a selected liquid in a continuous phase of another selected liquid by polycondensation at the interface therebetween wherein the selected liquids are such that polymer growth is outward from said interface away from the center of each said droplet.

Another object of the invention is to provide such an improved process wherein the selected liquids comprise an aqueous liquid for the droplet phase and an organic liquid for the continuous phase.

Another object of the invention is to provide such encapsulation with improved qualities of freedom from coalescence of the encapsulated bodies.

Another object of the invention is to provide such a process wherein substances which desirably must be encapsulated in aqueous solution can be encapsulated with efficiency and quality substantially equal to that attainable in the encapsulation of organic liquid bodies.

These and other objects and advantages of the invention will be more fully appreciated as a description of the practice of the invention is hereinafter set forth.

SUMMARY OF THE INVENTION

Briefly, the present invention contemplates the use of a unique class of colloids, such class being definable as fine, inert, insoluble solid particles, to overcome the unique problem, already described, with reference to the encapsulation of aqueous bodies, as defined. It has been found that such solid colloidal, i.e. finely divided, dispersing agents, rather than migrating to the original interface as do liquid dispersing agents, are instead capable of locating at the outer gummy growing polymer surface found in interfacial polymerization wherein the droplets are aqueous liquid. The particles inhabit or occupy the polymer-continuous liquid interface, and as the polymer grows outward more colloid particles precipitate as a layer at that interface, which is then the growing polymer surface. When the term "layer" is employed herein, it is to be understood that it defines the aforesaid arrangement of particles at the polymer-continuous liquid interface and subsequent growing surface; the layer of particles may be continuous or discontinuous and the stabilization will be afforded. By employing the proper kind and amount of solid colloid in the interface polymerization of aqueous droplets in an organic liquid continuous phase, encapsulated bodies may thus be produced relatively free of the problem of coalescence and agglomeration. The special problems associated with the interface polymerization of aqueous droplets are thereby obviated, and the production of encapsulated aqueous bodies by the process of the above-cited Vandegaer application Ser. No. 710,293 is thus rendered as efficient and relatively free of special problems as is the production of encapsulated organic liquid bodies. The particulate solid may be regarded as a solid dispersing agent in that it assists in keeping the individual capsules separate, and for convenience is herein referred to as such.

It is to be understood that the means by which the droplets become disposed within the continuous liquid does not bear upon the invention. While dispersion is one means, others may be employed, such for example, as by creating an ascending stream of droplets in a more dense continuous liquid by releasing same therein in discrete portions.

DETAILED DESCRIPTION

The invention is applicable to a large variety of polycondensation reactions, i.e. to many different pairs of reactants capable of interfacial condensation from the organic and the aqueous carrier liquids respectively to yield solid films by prompt, indeed usually immediate reaction at the liquid interface, generally at room temperature or at least at convenient temperatures. Indeed many polycondensation reactions, capable of effectuation between such reactants in separate, immiscible organic and aqueous liquids, are now well known, and appear to be capable of utilization in the present process. Thus as examples, the resulting capsule skin or enclosure may be produced about aqueous droplets in the organic liquid continuous phase as a simple polyamide, polysulfonamide, polyester, polycarbonate, polyurethane, or polyurea.

Other useful reactions involve mixtures of reactants in one or both of the continuous organic liquid and droplet aqueous liquid phases, so as to yield corresponding condensation polymers, or products involving cross-linking, the selection among a large variety of available reactions being made to suit the characteristics desired for the capsules, as to the nature, strength or other properties of the capsule wall, or to ensure suitability of the reaction conditions to the substances present for inclusion in the capsules. The term polycondensate is used to define all of the reaction products described herein, including cross-linked condensates (e.g. adding cross-linkages in the types mentioned above), and likewise copolymers, which may also involve cross-linking; for convenience of designation, moreover, generic references herein to a particular kind of condensate, e.g. polyurea or polyamide, or polyester, or any other, are intended (unless otherwise stated or apparent from the context) to include copolymers of which the specified single polymer is in effect a significant part. Thus for instance a recital, of the production of a polyurea, or of a polyurea capsule skin, is to be understood as including corresponding copolymers such as polyurea with polyamide (which can be specifically named, of course, by a hyphenated expression, having the same meaning whichever of the constituents is put first); thus likewise, in this illustration, recital of polyamide in a generic sense includes such polyurea-polyamide copolymer.

In all cases the effective procedure of the invention involves first producing the desired droplets of the aqueous liquid containing one reactant or group of reactants, within a continuous organic liquid phase which is essentially free of anything that will react by condensation with such reactant or any of such group of reactants. This may be accomplished by dispersion or otherwise, as aforesaid. The second reactant, or group of reactants, is then incorporated by addition to the continuous phase organic liquid, for instance conveniently by adding such further reactant material in solution in a further small quantity of the continuous phase organic liquid or other liquid readily miscible or otherwise distributable therein.

The addition of the solid dispersing agent to the continuous organic liquid phase may be by either or both of two modes. An excess of solid dispersing agent may be included in the initial charge, or post-addition at the polycondensation reaction, e.g. addition with the second reactant solution, may be practiced. In either case, the solid dispersing agent is available to the growing polymer surface. Both modes give excellent results, and a combination of the two or continuous addition often gives the best results. This, of course, does not preclude the possibility that the solid dispersing agent may be chemically so constituted that it would take part, in a minor way, in the polycondensation reaction. The essential requirement is, that after performing whatever other functions it has, e.g. dispersion or reaction, there should be sufficient solid dispersing agent remaining to form a layer, as above defined, of solid colloidal particles on the growing and final polymer surface, as already described.

By way of general example, it will now be seen that the aqueous phase may contain one or more of such substances as diamines, diols, polyols and other similar reactant materials, whereas the organic phase will contain one or more compounds such as diacid chlorides, bischloroformates, disulfonyl chlorides, polyacid chlorides, polychloroformates, diisocyanates, polyisocyanates, polysulfonyl chlorides, phosgene, or other organic intermediates capable of the desired condensation reaction with one or more reactants in the aqueous phase. The addition of the selected reactant or group of each phase is accomplished as described above, such addition to the continuous organic liquid phase, being made only after the distribution of aqueous droplets has been established.

The thickness or strength of the capsule wall can be selected or controlled in various ways, not only by control of reaction conditions but also by chemical selection. For instance in production of polyamide or polyester capsules by reaction of a diacid chloride, with a diamine or diol, a suitable reactive tri- or poly-functional acid chloride, and likewise or alternatively a suitably reactive tri- or poly-functional amine or -ol, can be used to effectuate cross-linking so as to strengthen the capsule skin by forming a three-dimensional polymer network. These cross-linking agents can be used in varying amounts, depending on purposes to be served and economic considerations. Further discussion of the advantages and choice of cross-linking agents may be found in the above-cited Vandegaer application Ser. No. 710,293. The thickness of the capsule skin can be altered by varying the amounts of reactants or the length of contact time between the liquids after the addition of the second reactant or group or reactants.

As more specific instances of polycondensation reactants to which the present encapsulation process is applicable, the following may be mentioned: diamines or polyamines in the aqueous phase and diacid or polyacid chlorides in the organic phase, capsule walls consisting of polyamides, conveniently sometimes described herein as nylon or nylons. Diamines or polyamines in the aqueous liquid and bischloroformates or polychloroformates in the organic liquid afford a polyurethane capsule skin. Again, diamines or polyamines in water and disulfonyl or polysulfonyl chlorides in the organic solvent produce a polysulfonamide skin. Likewise with diamines or polyamines in aqueous phase, a polyurea capsule wall is obtainable when the organic phase contains phosgene (chloroformyl chloride), which for convenience or classification herein may be considered to have the properties of a di-functional acid chloride, i.e. in some correspondence with diacid chlorides such as sebacoyl chloride. Also, diols or polyols in the aqueous liquid and diisocy- or polyisocyanates in the organic solvents produce a polyurea skin.

With diols or polyols in the aqueous liquid, various other condensate resins are achieved. Thus with diacid or polyacid chlorides in the organic phase, polyesters are produced to constitute the capsule wall. When bischloroformates, polychloroformates, or phosgene are used in the organic liquid the capsule skins are polycarbonates. It will further be appreciated that not only are there other complementary intermediates which react to form polycondensates in a direct manner useful in the interfacial condensation process of encapsulation, but various mixtures of intermediates, i.e., reactants, may be employed in either or both of the aqueous and organic phases. For example, mixtures of diols and diamines in the aqueous liquid and also or alternatively, mixtures of acid chlorides and chloroformates in the organic solvent are useful to achieve corresponding condensation copolymers. lso, diols or polyols in the aqueous liquid and diisocyanates or polyisocyanates in the organic liquid produce a polyurethane skin.

A wide variety of organic solvents may be employed as a continuous phase liquid, e.g. as will be recognized to be appropriate for the selected intermediates or immediates, some examples being mineral oil, xylene, benzene, carbon disulfide, carbon tetrachloride, pentane, and the like. The invention contemplates that other continuous phase liquids may be employed, that will cause outward polymer growth away from the aqueous droplets, provided they will serve the function of a solvent for the condensate-forming reactant and will form an interface with the aqueous body to be encapsulated.

Examples of di-functional acid-derived compounds are sebacoyl chloride, ethylene bischloroformate, phosgene, terephthaloyl chloride, adipolyl chloride, azelaoyl chloride (azelaic acid chloride), and 1,3-benzenesulfonyl dichloride. Polyfunctional compounds of this type are exemplified by trimesoyl trichloride, 1,2,4,5-benzene tetracid chloride, citric acid chloride, 1,3,5-benzene trisulfonyl chloride, and 1,3,5-benzene trischloroformate. Intermediates similarly useful in the organic phase also include diisocyanates and polyisocyanates, for example toluene diisocyanate, hexamethylene diisocyanate and polymethylene polyphenylisocyanate, e.g. Papi (The Carwin Co.).

As examples of suitable diols for use as intermediates in the aqueous phase, there may be named bis-phenol A [2,2-bis(p,p'-dihydroxy diphenyl)propane], hydroquinone, resorcinol, and various glycols such as ethylene glycol, hexanediol, dodecanediol, and the like. Polyfunctional alcohols of this character, e.g. triols, are exemplified by pyrogallol (1,2,3-benzenetriol), phloroglucinol dihydrate, pentaerythritol, trimethylolpropane, 1,4,9,10-tetrahydroxyanthracene, 3,4-dihydroxyanthranol, diresorcinol, tetrahydroxyquinone, anthralin.

Instances of suitable diamines and polyamines, usually selected as appropriately soluble per se or in soluble salt form, where such reactant is to be included in the aqueous phase, are ethylene diamine, diethylene triamine, phenylene diamine, toluene diamine, hexamethylene diamine, and piperazine, and substances which are understood to be capable of significant cross-linking effect, such as 1,3,5-benzenetriamine trihydrochloride, 2,4,6-triamino toluene trihydrochloride, tetratethylene pentamine, pentaethylene hexamine, polyethylene imine, 1,3,6-triaminonaphthalene, 3,4,5-triamino-1,2,4-triazole, melamine 1,4,5,8-tetramino anthraquinone. To the extent that the reactant to be used in the aqueous phase may be insoluble or have limited solubility in water per se, it may be used in a form or with appropriate cooperating substances to render it, in effect, soluble. Thus certains amines may be used in hydrochloride or other salt form, while a compound of little or no water solubility (by itself) such as bisphenol A may be used in a composition appropriately adjusted, as with alkali, to afford such solubility. Alternatively, a hydrophilic substitute for water may be employed, as for example methanol, provided the reactant is soluble therein. In either case, as already explained and defined, the liquid forming the droplets is termed "aqueous" herein.

In practical operation, normal precautions are taken to avoid unwanted reaction or modification of the substances employed. For example, care should preferably be taken to keep the organic phase, containing the diacid chloride or equivalent intermediate as dry as possible and in isolation from the atmosphere, to avoid hydrolysis. When the aqueous phase to be encapsualted is first distributed as droplets in a body of organic solvent, the diacid chloride is thereafter added in a further quantity of such solvent. This last-mentioned solution of the acid chloride should also, of course, be kept as dry as possible until actual addition and reaction.

In some cases, when dispersion is employed to distribute the aqueous droplets within the organic liquid, the agitation employed to establish that dispersion, can be reduced, indeed markedly, as and after the second, complementary intermediate is added to the organic liquid continuous phase, such reduction of agitation being of advantage to avoid any tendency toward rupture of the capsules as they form. At this stage of the process after the droplets have been established by dispersion, a chief requirement may simply be for good circulation to effectuate reaction with little or no agitation, but conditions may nevertheless warrant maintaining significant agitation as and after the second intermediate or reactant is added, for instance to maintain suspension of the finely divided solid agent in the continuous phase liquid, and in a number of cases satisfactory results have been achieved where the same moderately strong degree of agitation (used to produce the dispersion of droplets) is continued throughout the process.

While for the most part the condensations occur rapidly at room temperature, indeed essentially instantaneously, appropriate higher or lower temperatures may be employed if desirable for the selected reaction. Likewise, conventional cooperating reagents or additions for adjustment of alkalinity or other pH or like characteristics may be used, as for instance such substances as sodium hydroxide, sodium carbonate and sodium bicarbonate, variously utilized with amines and -ols for the usual reasons known in connection with these condensation reactions.

Solid dispersing agents are chosen, in accordance with the invention, from among the class of what may be called colloidal solid dispersing agents, and choice of a particular agent will be dictated by the nature of the chosen organic continuous phase liquid, the nature of the chosen organic intermediates carried by the two phases, and the nature of the polymer formed therefrom. Thus the finely particulate solid agent will be chosen to be efficacious and compatible with the various substances which are brought together during the practice of the invention. That is to say, the agent will be chosen in the first instance to act as a protective agent for stabilizing the growing polymer layer on aqueous droplets in a specified organic liquid continuous phase, and will be further chosen to be compatible with the reactants and any other substances carried by either the organic or aqueous phases. Finally, since the colloidal particles of the agent must be large enough to form a layer, as defined, on the growing polymer surface without passage therethrough, the agent will be selected with regard to the permeability of the forming polymer surface. This permeability may vary from polymer to polymer, and may to some extent also be affected by the nature of the organic phase liquid and reaction conditions. In general, cross-linked polymer surfaces will be less permeable, and this constitutes another advantage of cross-linking in the encapsulation by the present process.

While choice of a solid colloidal dispersing agent is thus preferably made on the basis of a variety of particulars in a given encapsulation combination of process substances and reactants, nevertheless it has been found that a finely particulate, solid agent which is workable with one combination of substances and reactants is generally workable with a wide variety of other such combinations. Indeed it will be apparent from what has been said that in general any of many different kinds of finely divided solids that would manifestly be substantially inert in the circumstances will be appropriate, desired characteristics being (as indicated above) that the particulate solid be substantially insoluble in the first, dispersed-phase liquid (of the droplets) and in the second, continuous-phase liquid, and be substantially inert to the intermediates which are to react for formation of the polymeric capsule skin, and to the solvents. Moreover, these are characteristics that are usually recognizable from known properties of any solid to be considered, or if desired, readily determinable by no more than simple test.

Particles that may be considered as colloidal include the range from about 10 A. to about 10,000 A. or one micron, but it is recognized that substantially larger particles have been so characterized, and moreover, some of the finely divided solids that have been satisfactorily employed for the invention, for instance as in certain of the specific examples in the group numbered up to XIV below, as well as in other examples, have in fact or inherently been characterized by average particle sizes considerably greater than one micron. The lower limit of particle size that will be operative with the present invention depends upon the polycondensate involved as aforesaid, and also depends upon the shape of the particles. However in general, it is believed that particles below about 100 A. may tend to pass through the polymer rather than remain at its outer surface to form a layer, as defined, thereon, and the effective portion of a solid colloid may constitute principally only the fraction of greater than that particle size. Preferably the mean particle size should be at least that large.

No rigorous operable upper limit may be stated because density of the particles and the suspending medium plays a part. Indeed while the 10,000 A. size mentioned above might for some purposes be deemed to be an approximate suspension limit, it appears that broadly, the requirement is simply that the particles be sufficiently fine to be kept in suspension in the continuous-phase organic liquid with the aid, if necessary, of moderate or otherwise tolerable agitation. Solid agents having mean particle size characteristics up to 5000 A., or up to 10,000 A., or substantially higher have been found useful. Moreover, certain examples hereinbelow involve substances wherein the size of some particles may range up to 40 microns or more. The preferred speed of action is somewhat inversely related to particle size, yet it is conceived that any above-noted values of upper or lower limits of mean size can be exceeded. Reasonable fineness is required for proper deposit on the growing, minute capsule skin (as with a particle diameter less than one tenth of that of the capsule), and the foregoing is believed to afford an ample guide for practice of the invention; indeed for any selected solid having a given mean particle size, it does not presently appear possible or necessary to determine whether the desired coating effect is exhibited mainly by a specific particle size fraction, or by the entirety, of such solid.

As has already been explained, any solid colloidal dispersing agent is operative, i.e. to function as the dispersing agent of the invention, provided it is compatible with the system constituents and meets the aforesaid, generally stated needs as to particle size. It has been found that mineral-derived solid colloids or the like give excellent results. Examples are talc, various colloidal clays, activated attapulgite (e.g. by Minerals and Chemicals Philipp Corp.), various silicates such as magnesium aluminum silicate (e.g. by R. T. Vanderbilt Co.), alumina ($Al_2O_3$) and other mineral-derived solid colloids. Further, finely particulate, inorganic solids of utility are calcium carbonate and magnesia (MgO). Organic derivatives of mineral solids are also useful, such as organically treated magnesium montmorillonite (e.g. by National Lead), and other treated mineral colloids. While mineral-derived and inorganic solid colloids are preferred since they tend to be compatible with a wide variety of substances useful in the reaction system, it is also acceptable to employ colloidal or similar substances of less inert or otherwise different nature such as colloidal metals, and organic and still other non-metallic solids, for example starch, carbon black, or polymeric particles, provided they are chosen to be compatible with the system of substances in the reaction medium, and with the polycondensate, or stated in another way, provided the particulate solid is substantially non-reactive with the polymer-forming intermediates and is substantially insoluble and inert in the continuous organic phase.

The following are a number of examples of the invention. It will be appreciated that a large variety of substances may be incorporated in the aqueous liquid within the polymer encapsulation. These substances may be dissolved, suspended, or otherwise carried by the aqueous content of the capsule. The non-agglomerative advantage of the invention will of course apply to any aqueous droplet capsules produced in accordance with the invention, regardless of what substances the aqueous liquid carries. The invention is particularly advantageous where a material requiring encapsulation is one that can only be put into an aqueous carrier. Unless otherwise stated the apparatus employed in the examples was a one liter baffled resin reactor, being a vessel or flask of conventional type, equipped with two inlets for addition funnels, and with agitating means, i.e. a rotary stirring device. All percentages herein are expressed by weight, unless otherwise stated.

EXAMPLE I

In this instance an aqueous liquid solution of an iron chelate, sodium ferric ethylene diamine di-(o-hydroxy phenyl acetate), was encapsulated. The iron chelate is a specific for the treatment of iron chlorosis, a disease of citrus plants. Because the iron chelate is water soluble, encapsulation of aqueous droplets is necessary in this case. The aqueous solution of iron chelate was encapsulated with an appropriate polycondensate skin, i.e. a polyamide. The following charges were made up:

In flask:
   450 ml. mineral oil (Humble Oil Co., Primol 325)
   200 ml. carbon tetrachloride
In 1st funnel:
   1 g. iron chelate [sodium ferric ethylene diamine di-(o-hydroxy phenyl acetate)]
   6 g. diethylene triamine
   6 g. ethylene diamine
   2 g. sodium carbonate monohydrate
   25 ml. distilled water
In 2nd funnel:
   25 g. sebacoyl chloride
   5 g. trimesoyl trichloride
   50 ml. pentane
   50 ml. carbon tetrachloride It will be noted that in this instance no dispersing agent was employed. The amine-containing aqueous phase was added and dispersed before addition of the acid chlorides to the continuous organic phase. Agitation was performed during, and for 20 seconds immediately after, addition of the aqueous phase from the first funnel, i.e. to produce droplets. Agitation was then slowed down and the contents of the second funnel was incorporated, and the reaction effected to produce the desired capsules. These capsules were then filtered on a Buchner funnel and air dried. Examination of the capsules revealed considerable coalescence and agglomeration.

EXAMPLE II

In this instance the procedure of Example I was repeated, except that two separate appropriate liquid dispersing agents were employed, including postaddition, as follows:

Example II: 0.2 g. of "Tween 80" (polyoxyethylene sorbitan monostearate, Atlas Chemical Industries, Inc.) incorporated in the 1st funnel, 0.3 g. "Span 65" (technical sorbitan monostearate, Atlas Chemical Industries, Inc.) incorporated in the 2nd funnel, and 1.0 g. "Span 65" in flask mixture.

In this instance the considerable agglomeration and coalescence, of Example I were not significantly decreased by use of the liquid dispersing agents.

EXAMPLE III

In this instance the procedure of Example I was repeated, with the addition that a solid colloidal dispersing agent was added to the initial organic liquid charge, and was also added by postaddition with the second addition solution. The solid dispersing agent employed was a colloidal magnesium aluminum silicate known as "Veegum F" manufactured by the R. T. Vanderbilt Co. The following charges were made up:

In flask:
   450 ml. mineral oil (Humble Oil Co., "Primol 325")
   200 ml. carbon tetrachloride
   2 g. colloidal magnesium aluminum silicate ("Veegum F" by R. T. Vanderbilt Co.)
In 1st funnel:
   1 g. iron chelate [sodium ferric ethylene diamine di-(o-hydroxy phenylacetate)]
   6 g. diethylene triamine
   6 g. ethylene diamine
   2 g. sodium carbonate monohydrate
   25 ml. distilled water
In 2nd funnel:
   25 g. sebacoyl chloride
   5 g. trimesoyl trichloride
   50 ml. pentane
   50 ml. carbon tetrachloride
   0.5 g. colloidal magnesium aluminum silicate ("Veegum F")

The amine-containing aqueous phase was added and dispersed before addition of the acid chlorides to the continuous organic phase. Agitation was performed during and for 20 seconds immediately after, addition of the aqueous phase from the 1st funnel, i.e. to produce visible droplets. Agitation was then slowed down and the contents of the 2nd funnel was incorporated and the reaction effected to produce the desired capsules. These capsules were then filtered on a Buchner funnel and air dried. The capsules were found to be free of coalescence and agglomeration.

EXAMPLES IV, V

In these instances the procedure of Example III was followed, except that in Example IV the entire 2.5 g. of the colloidal magnesium aluminum silicate was added in the initial charge, while in Example V the entire 2.5 g. thereof was added by postaddition in the 2nd addition solution. The results of Example V (only postaddition of dispersing agent) were not quite as good as the results of Example III (both initial and postaddition of dispersing agent), and the results of Example IV (only initial charge addition of the dispersing agent) was found to be not quite as good as the results of Example V. However, the resultant capsules were found in both cases to be virtually free of coalescence and agglomeration problems, and in both cases the results were a complete and significant advance over the results obtainable in Examples I and II wherein no solid colloidal dispersing agent was employed.

EXAMPLE VI

In this instance water droplets were encapsulated, to illustrate the general applicability of the process to aqueous bodies. While the capsules according to the present example contain nothing but water, anything that may be carried in an aqueous phase, in solution or in suspension or otherwise, which would be compatible with the polycondensate capsule concerned, could be inserted in the following example to be carried by the encapsulated water of the example. The solid colloidal dispersing agent of the present example was a pharmaceutical grade activated attapulgite, manufactured by the Minerals & Chemicals Philipp Corp. and having a mean particle size of about 2.9 microns. The following charges were made up:

In flask:
  350 ml. mineral oil: "Protol" (Sonneborn Chemical Co.)
  175 ml. carbon tetrachloride
  3 g. pharmaceutical grade activated attapulgite ("Pharmasorb" manufactured by the Minerals & Chemicals Philipp Corp.)
In 1st funnel:
  20 ml. distilled water
  2.5 g. 2,4,6 triamino toluene trihydrochloride
  0.4 g. sodium hydroxide
  3 g. hexamethylene diamine
In 2nd funnel:
  30 g. dodecanedioic acid chloride
  5 g. sym-benzene tetraacid chloride
  50 ml. carbon tetrachloride
  50 ml. pentane
  0.5 g. activated attapulgite ("Pharmasorb")

The amine-containing aqueous phase was added and dispersed before addition of the acid chlorides to the continuous organic phase. Agitation was performed during, and for 20 seconds immediately after, addition of the aqueous phase from the first funnel, i.e. to produce droplets. Agitation was then slowed down and the contents of the second funnel was incorporated, and the reaction effected to produce the desired capsules. These capsules were then filtered on a Buchner funnel and air dried. The capsules were found to be free of coalescence and agglomeration.

EXAMPLE VII

In this instance the encapsulated aqueous liquid illustrates the hydrophilic aspect of the aqueous class, as defined herein, rather than the water based aspect thereof. The general procedure of Example I was followed, and additionally the encapsulated liquid comprised methyl alcohol while the solid colloidal dispersing agent employed was U.S.P. grade talc, added with the initial charge and by postaddition. The following charges were made up:

In flask:
  500 ml. mineral oil (Humble Oil Co., "Primol 325")
  3.0 g. talc, U.S.P.
In 1st funnel:
  25 ml. methyl alcohol
  7 g. diethylenetriamine
In 2nd funnel:
  25 g. sebacoyl chloride
  50 ml. carbon tetrachloride
  50 ml. pentane
  0.5 g. talc, U.S.P.

The amine-containing aqueous phase was added and dispersed before addition of the acid chloride to the continuous organic phase. Agitation was performed during and for 20 seconds immediately after, addition of the aqueous phase from the 1st funnel. Agitation was then slowed down and the contents of the 2nd funnel was incorporated and the reaction effected to produce the desired capsules. The contents were stirred for three hours, then filtered on a Buchner funnel and air dried. The capsules were found to be free of coalescence and agglomeration.

EXAMPLE VIII

In this instance the procedure of Example VII was repeated, with different charges, including employment of rice powder starch (having a mean particle size of about 5 microns), manufactured by the Matheson, Coleman & Bell Laboratories, as the solid colloidal dispersing agent. The following charges were made up:

In flask:
  300 ml. mineral oil (Humble Oil Co., "Primol 325")
  175 ml. carbon tetrachloride
  3 g. rice powder starch
In 1st funnel:
  25 ml. distilled water
  7 g. diethylenetriamine
In 2nd funnel:
  25 ml. sebacoyl chloride
  3 g. trimesoyl trichloride
  0.5 g. rice powder starch
  50 ml. carbon tetrachloride
  50 ml. pentane After again following the procedure outlined Example VII, the resultant capsules were found to be free of coalescence or agglomeration.

EXAMPLE IX

In this instance the procedure of Examples VII and VIII was followed, but the solid colloidal dispersing agent employed was iron powder having a mean particle size of approximately 10 microns. The following charges were made up:

In flask:
  300 ml. mineral oil (Humble Oil Co., "Primol 325")
  175 ml. carbon tetrachloride
  3.0 g. iron powder
In 1st funnel:
  25 ml. distilled water
  2.5 g. 2,4,6-triamino toluene trihydrochloride
  0.4 g. sodium hydroxide
  4 g. ethylene diamine
In 2nd funnel:
  30 g. dodecanedioic acid chloride
  2 g. sym-benzene tetraacid chloride
  50 ml. carbon tetrachloride
  50 ml. pentane After again following the procedure outlined in Example VII, the resultant capsules were found to be free of coalescence or agglomeration.

EXAMPLE X

In this instance Example IX was repeated exactly, both in charges and in procedure, except that a different solid colloidal dispersing agent was employed. In place of the iron powder of Example IX, 30 g. "Celite Analytical Filter Aid," a diatomaceous silica product, manufactured by Johns-Manville Corporation, was added to the initial flask charge. Additionally 0.5 g. of the same diatomaceous material was added in the 2nd funnel charge. After again following the procedure outlined in Example VII, the resultant capsules were found to be free of coalescence or agglomeration. The finely divided diatomaceous solid here employed was very heterogeneous in particle size, ranging from large particles of up to 50 microns, to very small particles of the order of one micron or less.

EXAMPLE XI

In this instance the general procedure followed in Examples VII through X was employed, but the charges were chosen to produce encapsulation within a polyurea, and "LVM Attasorb," an attapulgus clay product, having a mean particle size of about 2.9 microns, manufactured by Minerals & Chemicals Philipp Corp., was employed. The following charges were made up:

In flask:
  300 ml. mineral oil (Humble Oil Co., "Primol 325")
  175 ml. carbon tetrachloride
  3.0 g. "LVM Attasorb"
In 1st funnel:
  20 ml. distilled water
  2.5 g. 2,4,6,triamino toluene trihydrochloride
  0.4 g. sodium hydroxide
  3.0 g. hexamethylenediamine
In 2nd funnel:
  30 g. 1,6-hexamethylenediisocyanate
  5 g. "Mondur MR" (mfd. by Mobay Chemical Co.) (polyisocyanate)
  0.5 g. "LVM Attasorb"
  50 ml. carbon tetrachloride
  50 ml. pentane After again following the procedure outlined in Example VII, the resultant capsules were found to be free of agglomeration and coalescence.

EXAMPLE XII

In this instance the general procedure of Example VII was followed, and a commercial ink, "Blue-Black #232," manufactured by the Shaeffer Pen Company, was encapsulated with the aid of "ASP-100," an aluminum silicate colloidal pigment with a mean particle size of 0.55 micron (5500 A.), manufactured by the Minerals & Chemicals Philipp Corp. The following charges were made up:

In flask:
  250 ml. mineral oil (Humble Oil Co., "Primol 325")
  175 ml. carbon tetrachloride
  3.0 g. "ASP-100"
In 1st funnel:
  20 ml. commerecial ink ("Blue-Black #232")
  2.5 g. 2,4,6-triamino toluene trihydrochloride
  0.4 g. sodium hydroxide
  2.0 g. hexamethylenediamine
In 2nd funnel:
  30 g. dodecanedioic acid chloride
  5 g. trimesoyl trichloride
  50 ml. carbon tetrachloride
  50 ml. pentane The procedure followed was that outlined in Example VII, and the resultant capsules were found to be free of agglomeration or coalescence.

EXAMPLE XIII

In this instance Example XII was essentially repeated, but instead of employing "ASP-100" in the flask, "Bentone 27," an organic derivative of a special magnesium montmorillonite, manufactured by the National Lead Company, was employed as the solid colloid, both in the flask and in the second funnel, and the contents of the second funnel was altered. The following charges were made up:

In flask:
  350 ml. mineral oil (Humble Oil Co., "Primol 325")
  175 ml. carbon tetrachloride
  3.0 g. "Bentone 27"
In 1st funnel:
  20 ml. commercial ink ("Blue-Black #232")
  2.5 g. 2,4,6-triamino toluene trihydrochloride
  0.4 g. sodium hydroxide
  3.0 g. hexamethylenediamine
In 2nd funnel:
  30 g. dodecanedioic acid chloride
  5 g. sym. benzene tetraacid chloride
  0.5 g. "Bentone 27"
  50 ml. carbon tetrachloride
  50 ml. pentane The procedure followed was again that outlined in Example VII, and the resultant capsules were found to be free of agglomeration and coalescence.

EXAMPLE XIV

In this instance Example XI was followed exactly, except that 30 g. of diethyleneglycol bischloroformate was employed in the 2nd funnel in place of the 30 g. of 1,6-hexamethylenediisocyanate. A polyurethane encapsulation skin was thereby formed, and the resultant capsules were found to be free of agglomeration and coalescence.

EXAMPLE XV

In this and the following examples, to illustrate other finely particulate solid dispersing agents, basically the same apparatus and procedure were employed, including a one liter baffled resin flask equipped with a Servodyne stirrer. The continuous phase liquid, i.e. of organic or oil type, was established in the flask, then the aqueous phase liquid (being water, for simplicity of example) was added and dispersed as droplets containing the amine reagent, and thereafter the acid chloride was incorporated in the continuous phase and stirring continued, yielding minute polyamide capsules containing the aqueous liquid. In all cases the basic substances were as follows, disregarding the added solid:

In flask:
  500 ml. mineral oil (Drake U.S.P. white, 340–365)
  140 ml. carbon tetrachloride
1st addition:
  25 ml. water
  7 g. diethylenetriamine
2nd addition:
  25 g. sebacoyl chloride
  50 ml. carbon tetrachloride
  50 ml. pentane The additions were made consecutively. Agitation by the stirrer, beginning with the first addition, was kept constant throughout at 300 r.p.m. After three hours the capsules were filtered on a Buchner funnel and air dried.

A preliminary encapsulation was run as a control, with no solid agent present, and the resulting capsules were characterized by considerable coalescence and agglomeration. The operation of the example was then carried out, with 3 g. talc U.S.P. ($3MgO.4SiO_2.H_2O$) initially included in the mineral oil continuous phase in the flask and 0.5 g. of the same talc in the second addition. The talc had a particle size range essentially from 4 to 40 microns. The produced capsules were found to be basically free of coalescence and agglomeration.

EXAMPLE XVI

The operation was the same as in Example XV, except that the finely divided solid was alumina (aluminum oxide, $Al_2O_3$), being "Alon C" of Cabot corp., having an average particle diameter of 0.03 micron. 3 g. were included in the oil phase at the start and 0.5 g. added with the acid chloride reactant. Again the capsules were basically free of coalescence and agglomeration.

EXAMPLE XVII

In this instance, again operating as in Example XV, the solid agent was calcium carbonate ($CaCO_3$, precipitated, particle sizes approximately 4 to 30 microns), added in the same amounts, 3 g. at the start and 0.5 g. with the acid chloride. The capsules showed like freedom from coalescence and agglomeration.

EXAMPLE XVIII

The operation of Example XV was again repeated, now using magnesia (MgO, particle size about 2 to 20 microns) as the particulate solid agent, 3 g. added at the beginning and 0.5 g. with the acid chloride. The capsules were noted to be basically free of coalescence and agglomeration.

EXAMPLE XIX

In another repetition of the procedure of Example XV, the fine dispersing agent was carbon black (Royal 400R) stated to have a particle size in the neighborhood of 25 millimicrons; 3 g. were initially put in the continuous phase liquid and 0.5 g. included in the sebacoyl chloride addition. Again the produced minute capsules were essentially free from coalescence and agglomeration.

What has been described is a process for encapsulating aqueous bodies, as defined herein, by an interfacial polycondensation technique wherein one reactant is added to the continuous phase and the other to the discontinuous or droplet phase, wherein the problem of agglomeration or coalescence heretofore encountered with so encapsulated aqueous bodies, has been avoided by employment of solid, finely particulate, e.g. colloidal, agents, as described. Viewed differently, what has been described is such a process, for encapsulating bodies of a first liquid disposed as droplets in a second liquid, the first and second liquids being substantially immiscible, wherein the character of the two liquids is such that the polymer growth on the droplets is outward so as to normally cause coalescence and agglomeration of encapsulated droplets, yet wherein the invention prevents same with all the attendant benefits, by proper employment of a solid colloidal agent, as described. In addition to the enumerated solid agents, any other is useful with the invention, provided it is not soluble or substantially soluble in one or more of the liquids employed in the process, and providing it falls within the size limitations and is compatible with the process liquids, reactants, and products, all as already described.

It is to be understood that the invention is not limited to the specific compounds and operations herein described but may be carried out in other ways without departure from its spirit.

We claim:

1. A process of encapsulation by interfacial condensation of a pair of complementary, organic, polycondensate-forming intermediates in separate first and second liquids which are substantially immiscible, for encapsulating droplets of said first liquid within a skin of the produced polycondensate to yield capsules relatively free from coalescence and agglomeration tendencies, said polycondensate being selected from the group consisting of polyamide, polysulfonamide, polyester, polycarbonate, polyurethane and polyurea, said first liquid being aqueous and said second liquid being non-aqueous organic liquid and the character of said liquids being such that said polycondensate skin grows away from said first liquid and into said second liquid at any interface therebetween, comprising establishing, by agitation, a dispersion of droplets of said first liquid, which contains one of the intermediates, disposed within a continuous phase body of the said second liquid; and thereafter adding the second of the intermediates to said continuous second liquid phase, to effectuate a polycondensation reaction between the intermediates at the interfaces of the first droplets and the continuous second liquid phase; and adding a finely particulate solid dispersing agent to said second liquid so that said agent is present as a particulate, substantially inert solid suspended in said continuous organic liquid phase as said polycondensate skin grows, while agitating said continuous liquid phase having said droplets dispersed therein, said solid agent being substantially insoluble in said first and second liquids and substantially inert to said intermediates, and being of sufficient particle size to be retained on the polycondensate skin surface.

2. A process according to claim 1, wherein a major part of said finely particulate agent is added to the continuous second liquid prior to establishment of the droplets of the first liquid therein, and the remaining part of said finely particulate agent is added to said continuous second liquid with the second of the intermediates.

3. A process according to claim 1, wherein the step of adding said solid particulate dispersing agent is accomplished prior to the step of adding the second of the intermediates to said continuous second liquid phase, and the addition of said solid particulate dispersing agent is made to said continuous second liquid phase.

4. A process according to claim 1, wherein the step of adding said solid particulate dispersing agent is in part accomplished prior to the step of adding the second of the intermediates to said continuous second liquid phase, by adding a portion of said solid agent directly to said continuous liquid phase, the remaining portion of said solid agent being added to the second of the intermediates and thereby added with said second intermediate to the continuous phase.

5. A process according to claim 1, wherein said solid particulate dispersing agent comprises at least a substantial fraction of particles having a particle size greater than about 100 A. mean diameter.

6. A process according to claim 1, wherein said solid particulate dispersing agent comprises at least a substantial fraction of particles having a mean diameter between about 100 A. and about 10 microns.

7. A process of encapsulation by interfacial condensation of a pair of complementary, organic, polycondensate-forming intermediates in separate respective aqueous and organic liquids which are substantially immiscible, for encapsulating droplets of said aqueous liquid within a skin of the produced polycondensate to yield capsules relatively free from coalescence and agglomeration tendencies, said polycondensate being selected from the group consisting of polyamide, polysulfonamide, polyester, polycarbonate, polyurethane and polyurea, comprising establishing, by agitation, a dispersion of droplets of said aqueous liquid, which contains one of the intermediates, disposed within a continuous phase body of the said organic liquid, each said droplet forming an interface with said organic liquid; and thereafter adding the second of the intermediates to said continuous organic liquid phase, to effectuate a polycondensation reaction between the intermediates at the interface of each of the aqueous droplets and the continuous organic liquid phase; and adding sufficient finely particulate solid dispersing agent to said organic liquid to continuously supply a layer of fine particles to the growing polycondensate skin during said polycondensation reaction, said solid agent being present as a particulate, substantially inert solid suspended in said continuous organic liquid phase as said skin grows, while agitating said continuous liquid phase having said droplets dispersed therein, and said solid agent being substantially insoluble in said aqueous and organic liquids and substantially inert to said intermediates, and being of sufficient particle size to be retained on the polycondensate skin surface.

References Cited

UNITED STATES PATENTS

| | | | |
|---|---|---|---|
| 2,800,457 | 7/1957 | Green et al. | 252—316 |
| 2,897,122 | 7/1959 | Millar | 424—33 |
| 3,270,100 | 8/1966 | Jolkovski et al. | 252—316X |

FOREIGN PATENTS

| | | | |
|---|---|---|---|
| 950,443 | 2/1964 | Great Britain | 264—4 |

RICHARD D. LOVERING, Primary Examiner

U.S. Cl. X.R.

8—79; 47—58; 71—65; 99—140, 166; 106—20, 22, 23; 117—100; 252—182, 186; 264—4; 424—32

UNITED STATES PATENT OFFICE
CERTIFICATE OF CORRECTION

Patent No. 3,575,882                     Dated April 20, 1971

Inventor(s) JAN E. VANDEGAER and FRANK G. MEIER

It is certified that error appears in the above-identified paten and that said Letters Patent are hereby corrected as shown below:

Col. 1, line 55, "at" should read --as--

Col. 6, line 9, "diols or polyols in the aqueous liquid" should read --diamines or polyamines in water--

Col. 6, line 28, "1so" should read --Also--

Col. 7, line 5, "certains" should read --certain--

Col. 13, line 40, "250" should read --350--

Col. 13, line 44, "commerecial" should read --commercial--

Signed and sealed this 7th day of September 1971.

(SEAL)
Attest:

EDWARD M. FLETCHER, JR.
Attesting Officer

ROBERT GOTTSCHALK
Acting Commissioner of Pa